US011930271B2

(12) United States Patent
Shigeta

(10) Patent No.: US 11,930,271 B2
(45) Date of Patent: Mar. 12, 2024

(54) INTERMEDIATE ACCESSORY APPARATUS, IMAGE PICKUP APPARATUS, IMAGE PICKUP SYSTEM, PROCESSING METHOD, AND STORAGE MEDIUM

(71) Applicant: CANON KABUSHIKI KAISHA, Tokyo (JP)

(72) Inventor: Junji Shigeta, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 17/471,003

(22) Filed: Sep. 9, 2021

(65) Prior Publication Data

US 2022/0086330 A1    Mar. 17, 2022

(30) Foreign Application Priority Data

Sep. 16, 2020    (JP) .............................. JP2020-155593

(51) Int. Cl.
*H04N 23/66* (2023.01)
*H04N 23/663* (2023.01)
*H04N 23/68* (2023.01)

(52) U.S. Cl.
CPC ......... *H04N 23/663* (2023.01); *H04N 23/681* (2023.01)

(58) Field of Classification Search
None
See application file for complete search history.

(56) References Cited

U.S. PATENT DOCUMENTS

| 5,548,369 A * | 8/1996 | Iijima .................... G03B 17/14 396/529 |
| 7,522,828 B2 * | 4/2009 | Doi ........................ G03B 17/56 348/360 |
| 2006/0098114 A1 * | 5/2006 | Horii ...................... H04N 23/55 348/360 |
| 2011/0229115 A1 | 9/2011 | Okada |

(Continued)

FOREIGN PATENT DOCUMENTS

| EP | 3410198 A1 | 12/2018 |
| JP | 2006171392 A | 6/2006 |

(Continued)

*Primary Examiner* — Cynthia Segura
(74) *Attorney, Agent, or Firm* — Canon U.S.A., Inc. IP Division

(57) ABSTRACT

An intermediate accessory apparatus configured to be detachably mounted between an interchangeable lens apparatus and an image pickup apparatus includes a storage configured to store characteristic information about a combined optical characteristic of the interchangeable lens apparatus and the intermediate accessory apparatus, the characteristic information being associated with state information indicating a state of the interchangeable lens apparatus, the state information being communicated via a first communication between the interchangeable lens apparatus and the image pickup apparatus, and a processor configured to receive identification information about the interchangeable lens apparatus from the image pickup apparatus, and transmit the characteristic information corresponding to the identification information to the image pickup apparatus, via a second communication between the intermediate accessory apparatus and the image pickup apparatus.

28 Claims, 8 Drawing Sheets

(56) References Cited

U.S. PATENT DOCUMENTS

| | | | | |
|---|---|---|---|---|
| 2012/0033955 A1* | 2/2012 | Okada | ...................... | G02B 7/14 |
| | | | | 396/71 |
| 2017/0235214 A1* | 8/2017 | Seki | ..................... | G03B 17/565 |
| | | | | 396/529 |
| 2018/0224721 A1* | 8/2018 | Pan | ........................ | H04N 23/55 |
| 2018/0224722 A1* | 8/2018 | Pan | ...................... | G03B 17/565 |
| 2018/0352122 A1* | 12/2018 | Yasuda | .................. | H04N 23/57 |
| 2018/0352123 A1* | 12/2018 | Mizuochi | ............... | H04N 23/55 |
| 2018/0352139 A1* | 12/2018 | Sugita | .................. | H04N 23/663 |
| 2018/0352140 A1* | 12/2018 | Tsukamoto | .......... | H04N 23/663 |
| 2018/0352141 A1* | 12/2018 | Saito | ................... | G03B 17/565 |
| 2019/0285967 A1* | 9/2019 | Himei | .................... | H04N 23/68 |
| 2020/0004112 A1* | 1/2020 | Sugita | .................. | H04N 23/69 |
| 2020/0007744 A1* | 1/2020 | Sugiyama | ......... | H04N 23/6812 |
| 2022/0082904 A1* | 3/2022 | Tada | ....................... | G03B 17/14 |

FOREIGN PATENT DOCUMENTS

| | | |
|---|---|---|
| JP | 2011-197094 A | 10/2011 |
| JP | 2018205705 A | 12/2018 |

\* cited by examiner

FIG.3

| INTERCHANGEABLE LENS APPARATUS IDENTIFICATION INFORMATION | A | B | C |
|---|---|---|---|
| IMAGE CAPTURING CONTROL INFORMATION | OBJECT DISTANCE FA | OBJECT DISTANCE FB | OBJECT DISTANCE FC |
| | SENSITIVITY SA | SENSITIVITY SB | SENSITIVITY SC |
| | FOCAL LENGTH ZA | FOCAL LENGTH ZB | FOCAL LENGTH ZC |
| | F-NUMBER IA | F-NUMBER IB | F-NUMBER IC |
| CORRECTION CONTROL INFORMATION | OUT-OF-FOCUS PCA | OUT-OF-FOCUS PCB | OUT-OF-FOCUS PCC |
| | MAGNIFICATION CHROMATIC ABERRATION ACA | MAGNIFICATION CHROMATIC ABERRATION ACB | MAGNIFICATION CHROMATIC ABERRATION ACC |
| | DECREASE IN MARGINAL ILLUMINATION SCA | DECREASE IN MARGINAL ILLUMINATION SCB | DECREASE IN MARGINAL ILLUMINATION SCC |
| | DISTORTION DCA | DISTORTION DCB | DISTORTION DCC |

FIG.4

| FOCUS POSITION | ZOOM POSITION | IRIS POSITION | OBJECT DISTANCE F | SENSITIVITY S | FOCAL LENGTH Z | F-NUMBER I | OUT-OF-FOCUS PC | MAGNIFICATION CHROMATIC ABERRATION AC | DECREASE IN MARGINAL ILLUMINATION SC | DISTORTION DC |
|---|---|---|---|---|---|---|---|---|---|---|
| F1 | Z1 | 1 | FI11 | SI11 | ZI11 | I111 | PC111 | AC111 | SC111 | DC111 |
|  |  | 2 | FI12 | SI12 | ZI12 | I112 | PC112 | AC112 | SC112 | DC112 |
|  |  | ⋮ |  |  |  |  |  |  |  |  |
|  |  | N |  |  |  |  |  |  |  |  |
|  | Z2 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | ⋮ | ⋮ |  |  |  |  |  |  |  |  |
|  | ZM | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
| F2 | Z1 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | Z2 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | ⋮ | ⋮ |  |  |  |  |  |  |  |  |
|  | ZM | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
| ⋮ | ⋮ | ⋮ |  |  |  |  |  |  |  |  |
| FL | Z1 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | Z2 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | ⋮ | ⋮ |  |  |  |  |  |  |  |  |
|  | ZM | 1 |  |  |  |  |  |  |  |  |
|  |  | 2 |  |  |  |  |  |  |  |  |
|  |  | ⋮ |  |  |  |  |  |  |  |  |
|  |  | N | FLMN | SLMN | ZLMN | ILMN | PCLMN | ACLMN | SCLMN | DCLMN |

FIG.5A

| INTERCHANGEABLE LENS APPARATUS A | NORMALIZED POSITION OF FOCUS LENS UNIT | 1 | 2 | 3 | ... | N |
|---|---|---|---|---|---|---|
| | FOCUS POSITION | F1 | F2 | F3 | ... | FN |

FIG.5B

| INTERCHANGEABLE LENS APPARATUS B | OBJECT DISTANCE | 0.5 m | 0.6 m | 0.7 m | ... | ∞ |
|---|---|---|---|---|---|---|
| | FOCUS POSITION | F1 | F2 | F2 | ... | FN |

FIG.5C

| INTERCHANGEABLE LENS APPARATUS C | OBJECT DISTANCE | 0.5 m | | 0.6 m | ... | ∞ |
|---|---|---|---|---|---|---|
| | FOCUS SENSITIVITY | S1 | | S2 | ... | Sx |
| | FOCUS POSITION | F0 | F1 | F2 | ... | FN |

FIG.8

| INTERCHANGEABLE LENS APPARATUS IDENTIFICATION INFORMATION | A | | | B | | | C | | | A | | |
|---|---|---|---|---|---|---|---|---|---|---|---|---|
| ADAPTER IDENTIFICATION INFORMATION | NONE | | | NONE | | | NONE | | | D | | |
| IMAGE CAPTURING CONTROL INFORMATION | OBJECT DISTANCE FA | SENSITIVITY SA | FOCAL LENGTH ZA | OBJECT DISTANCE FB | SENSITIVITY SB | FOCAL LENGTH ZB | OBJECT DISTANCE FC | SENSITIVITY SC | FOCAL LENGTH ZC | OBJECT DISTANCE FA | SENSITIVITY SA | FOCAL LENGTH ZA |
| CORRECTION CONTROL INFORMATION | F-NUMBER IA | OUT-OF-FOCUS PCA | MAGNIFICATION CHROMATIC ABERRATION ACA | F-NUMBER IB | OUT-OF-FOCUS PCB | MAGNIFICATION CHROMATIC ABERRATION ACB | F-NUMBER IC | OUT-OF-FOCUS PCC | MAGNIFICATION CHROMATIC ABERRATION ACC | F-NUMBER IA | OUT-OF-FOCUS PCA | MAGNIFICATION CHROMATIC ABERRATION ACA |
| | DECREASE IN MARGINAL ILLUMINATION SCA | DISTORTION DCA | | DECREASE IN MARGINAL ILLUMINATION SCB | DISTORTION DCB | | DECREASE IN MARGINAL ILLUMINATION SCC | DISTORTION DCC | | DECREASE IN MARGINAL ILLUMINATION SCA | DISTORTION DCA | |

INTERMEDIATE ACCESSORY APPARATUS, IMAGE PICKUP APPARATUS, IMAGE PICKUP SYSTEM, PROCESSING METHOD, AND STORAGE MEDIUM

BACKGROUND OF THE INVENTION

Field of the Invention

The present invention relates to an intermediate accessory apparatus, an image pickup apparatus, an image pickup system, an image pickup method, and a storage medium.

Description of the Related Art

There is known an image capturing system including a camera body (image capturing apparatus) and accessory apparatuses (e.g., an interchangeable lens apparatus and an intermediate accessory apparatus, such as a wide converter or a teleconverter, which are mounted between the camera body and the interchangeable lens apparatus) as system elements. Some known image capturing systems cause the camera body to control accessory apparatuses, and such image capturing systems cause the camera body to acquire control information unique to the interchangeable lens apparatus used for performing proper controls of focusing, aperture diaphragm operation, zooming, and other operations, from the interchangeable lens apparatus.

With an intermediate accessory apparatus provided between the camera body and the interchangeable lens apparatus, control information unique to the intermediate accessory apparatus to be used in the above controls is taken into account in addition to control information unique to the interchangeable lens apparatus for the above proper controls.

Japanese Patent Application Laid-Open No. 2018-205705 discusses an image capturing system with the camera body to identify an element that combines control information unique to the interchangeable lens apparatus with control information unique to an intermediate accessory apparatus based on the pieces of identification information about the interchangeable lens apparatus and the intermediate accessory apparatus mounted on the camera body. The image capturing system performs the combining processing with the identified element.

The image capturing system discussed in Japanese Patent Application Laid-Open No. 2018-205705 causes the identified element of the image capturing system to combine the control information unique to the interchangeable lens apparatus with the control information unique to the intermediate accessory apparatus. The combining processing performed by the element uses resources (hardware, software, and time).

SUMMARY OF THE INVENTION

An aspect of disclosures provides, for example, an intermediate accessory apparatus beneficial for an image pickup apparatus to perform control of an interchangeable lens apparatus.

According to an aspect of the present invention, an intermediate accessory apparatus configured to be detachably mounted between an interchangeable lens apparatus and an image pickup apparatus includes a storage configured to store characteristic information about a combined optical characteristic of the interchangeable lens apparatus and the intermediate accessory apparatus, the characteristic information being associated with state information indicating a state of the interchangeable lens apparatus, the state information being communicated via a first communication between the interchangeable lens apparatus and the image pickup apparatus, and a processor configured to receive identification information about the interchangeable lens apparatus from the image pickup apparatus, and transmit the characteristic information corresponding to the identification information to the image pickup apparatus, via a second communication between the intermediate accessory apparatus and the image pickup apparatus.

Further features of the present invention will become apparent from the following description of embodiments with reference to the attached drawings.

BRIEF DESCRIPTION OF THE DRAWINGS

FIG. 3 is a table illustrating details of each control information group according to the first embodiment.

FIG. 4 is a table illustrating a data structure of each control information group according to the first embodiment.

FIGS. 5A to 5C are tables each illustrating a conversion table between an index and state information according to the first embodiment.

FIG. 8 is a table illustrating details of each control information group according to the second embodiment.

DESCRIPTION OF THE EMBODIMENTS

Some embodiments of the present invention will be described below with reference to the accompanying drawings. Like numbers refer to like members (unless otherwise noted) throughout the drawings illustrating the embodiments, and repetitive descriptions of the members will be omitted.

Figure 1:
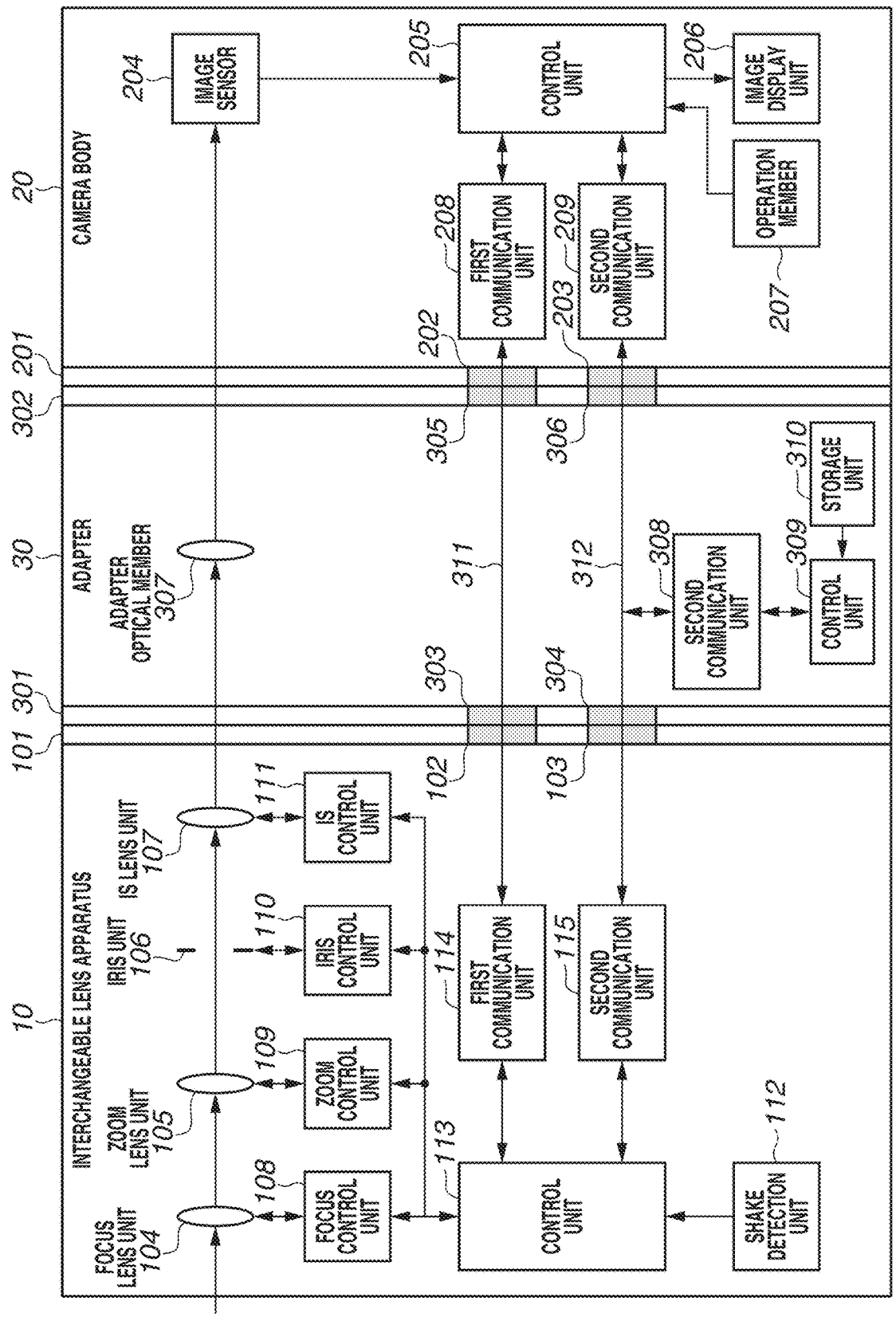
FIG. 1 is a block diagram illustrating a configuration example of an image capturing system according to a first embodiment.

A first embodiment will be described with reference to FIGS. 1 to 5C. An image capturing system (also referred to as an image pickup system) according to the first embodiment includes a first communication channel used for communications between a camera body 20 (also referred to as an image capturing apparatus or an image pickup apparatus) and an interchangeable lens apparatus 10, and a second communication channel used for communications between the camera body 20 and an adapter 30 (intermediate accessory apparatus), separately from the first communication channel. FIG. 1 is a block diagram illustrating a configuration example of the image capturing system according to the first embodiment. In FIG. 1, the interchangeable lens apparatus 10 includes movable optical members. The camera body 20 includes an image sensor. The adapter 30 is an intermediate accessory apparatus, such as an extender, detachably mounted between the interchangeable lens apparatus 10 and the camera body 20.

The interchangeable lens apparatus 10, the adapter 30, and the camera body 20 are detachably mounted together through mounts 101, 301, 302, and 201. The mount 101 is included in the interchangeable lens apparatus 10. The mount 301 and the mount 302 are included in the adapter 30. The mount 201 is included in the camera body 20. The mounts 101, 301, 302, and 201 are provided with one or more contacts (terminals) 102, 303, 305, and 202, respectively, for carrying out communications by a first communication method. An 'N-th communication method' is also simply referred to as an 'N-th communication'. The contacts 102 and 303 and the contacts 305 and 202 are electrically connected to each other with the interchangeable lens apparatus 10, the adapter 30, and the camera body 20 mounted (connected) to one another. The first communication method is used for the camera body 20 to control the movable optical members in the interchangeable lens apparatus 10.

The mounts 101, 301, 302, and 201 each are provided with one or more contacts (terminals) 103, 304, 306, and 203, respectively, for carrying out communications by a second communication method. The contacts 103 and 304 and the contacts 306 and 203 are electrically connected to each other with the interchangeable lens apparatus 10, the adapter 30, and the camera body 20 mounted to one another. The second communication method is used for a point-to-multipoint communication (broadcast communication) or a peer-to-peer communication (P2P communication) between the camera body 20, the interchangeable lens apparatus 10, and the adapter 30.

A focus lens unit 104 is used to focus on an object. A zoom lens unit 105 is used for zooming (magnification). An iris unit (aperture diaphragm) 106 is used to make an adjustment of the quantity of light or an aperture adjustment. An image stabilization (IS) lens unit 107 is used to reduce image blurring. A focus control unit 108 is used to control driving of the focus lens unit 104. A zoom control unit 109 is used to control driving of the zoom lens unit 105. An iris control unit 110 is used to control driving of the iris unit 106. An IS control unit 111 is used to control driving of the IS lens unit 107. The focus control unit 108, the zoom control unit 109, the iris control unit 110, and the IS control unit 111 each can include a position detection unit and a motor, for example. A shake detection unit 112 is used to detect a shake (vibration) of the interchangeable lens apparatus 10, and can include a gyroscope, for example.

A control unit 113 is included in the interchangeable lens apparatus 10. A first communication unit 114 is used to carry out communications by the first communication method in the interchangeable lens apparatus 10. A second communication unit 115 is used to carry out communications by the second communication method in the interchangeable lens apparatus 10. The control unit 113, the first communication unit 114, and the second communication unit 115 can be parts of a central processing unit (CPU) (processing unit) included in the interchangeable lens apparatus 10.

An image sensor 204 (also referred to as an image pickup element) is used to capture or pick up an image formed via the interchangeable lens apparatus 10 and the adapter 30, and can include, for example, a complementary metal oxide (CMOS) image sensor. A control unit 205 is included in the camera body 20. A first communication unit 208 is used to carry out communications by the first communication method in the camera body 20. A second communication unit 209 is used to carry out communications by the second communication method in the camera body 20. The control unit 205, the first communication unit 208, and the second communication unit 209 can be parts of a CPU (processing unit) included in the camera body 20. A picture display unit (an image display unit) 206 displays a picture (an image) obtained through image capturing (pickup) by the image sensor 204, and can include a liquid crystal monitor, for example. An operation member 207 is used to set image capturing conditions (control image capturing), and can include a dial ring and a switch, for example.

An optical member (adapter optical member) 307 is included in the adapter 30, and can include a magnification lens unit and a neutral density (ND) filter, for example. A second communication unit 308 is used to carry out communications by the second communication method in the adapter 30. A control unit 309 is included in the adapter 30. The second communication unit 308 and the control unit 309 can be parts of a CPU (processing unit) included in the adapter 30, for example. A storage unit 310 stores control information corresponding to identification information about the interchangeable lens apparatus 10, and can include a flash memory, for example. The control information will be described below.

In the present embodiment, image information is acquired from light incident on as described below. Specifically, light incident on the interchangeable lens apparatus 10 forms an image (optical image) on the image sensor 204 through the focus lens unit 104, the zoom lens unit 105, the iris unit 106, the IS lens unit 107, and the adapter optical member 307. The image is converted into an electrical signal by the image sensor 204. The electrical signal is converted into an image signal by the control unit 205. The image signal can be displayed by the image display unit 206, can be stored in a storage medium, or can be transmitted to an external apparatus.

Figure 2:
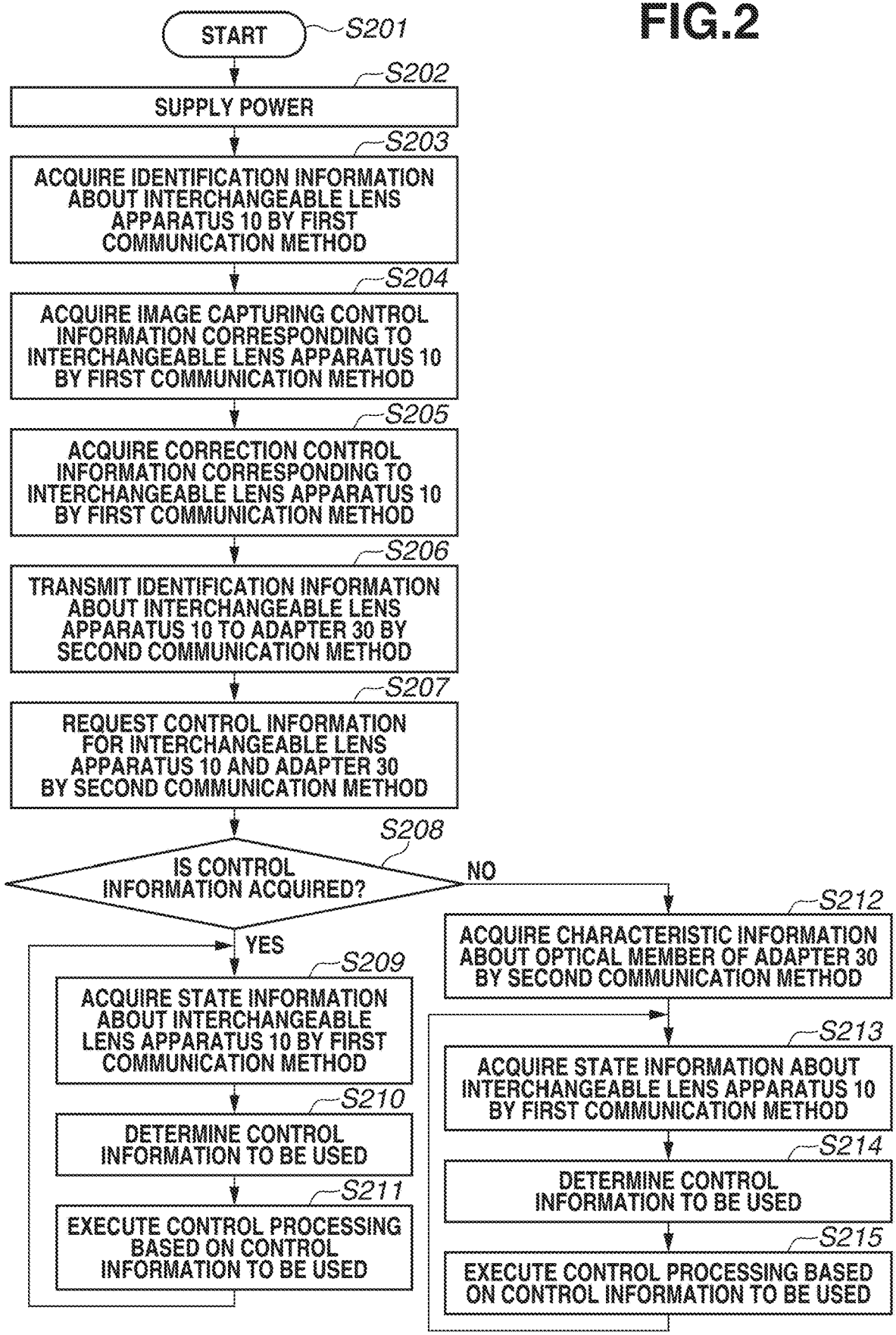
FIG. 2 is a flowchart illustrating a processing procedure according to the first embodiment.

A processing procedure will be described in which the camera body 20 controls image capturing and correction processing on an image signal using the interchangeable lens apparatus 10 and the adapter 30 with reference to FIG. 2. FIG. 2 is a flowchart illustrating the processing procedure according to the first embodiment. In FIG. 2, first, in step S201, the camera body 20 is started, and then the processing proceeds to step S202.

In step S202, the control unit 205 supplies power to the interchangeable lens apparatus 10 and the adapter 30 through the contacts on the mount 201 for power supply. Then, the processing proceeds to step S203.

In step S203, the control unit 205 transmits to the interchangeable lens apparatus 10 a command (information) for requesting the identification information about the interchangeable lens apparatus 10 by the first communication method through the first communication unit 208. In the interchangeable lens apparatus 10, upon receiving the command by the first communication method through the first communication unit 114, the control unit 113 transmits the identification information about the interchangeable lens apparatus 10 to the camera body 20 by the first communication method through the first communication unit 114.

In step S204, the control unit 205 in the camera body 20 transmits a command (information) for requesting image capturing control information corresponding to the received identification information about the interchangeable lens apparatus 10 to the interchangeable lens apparatus 10 by the first communication method through the first communication unit 208.

The control information corresponding to the identification information includes image capturing control information for controlling image capturing conditions (state) of the interchangeable lens apparatus 10. Examples of the image capturing control information include information about a state (position and aperture) of the focus lens unit 104, a state of the zoom lens unit 105, and a state of the iris unit 106, and information about an object distance, a focal length, an F-number, and other characteristics. The control information also includes correction control information for correcting an image signal that will be or has been obtained by image capturing using the image sensor 204. The correction control information is used to reduce out-of-focus by the driving of the focus lens unit 104. Other lens units, as well as the focus lens unit 104, can be driven to reduce out-of-focus. The correction control information can include information used for image signal processing (image processing) to compensate for a magnification chromatic aberration, information used for image signal processing (image processing) to compensate for decrease in marginal illumination (peripheral darkening), and information used for image signal processing (image processing) to compensate for distortion. The correction control information will be described in more detail below. In the interchangeable lens apparatus 10, the control unit 113 receives from the camera body 20 the command for requesting image capturing control information by the first communication method through the first communication unit 114. Then, the control unit 113 transmits the image capturing control information related to the interchangeable lens apparatus 10 to the camera body 20 by the first communication method through the first communication unit 114.

In step S205, the control unit 205 in the camera body 20 transmits a command (information) for requesting the correction control information corresponding to the received identification information about the interchangeable lens apparatus 10 to the interchangeable lens apparatus 10 by the first communication method through the first communication unit 208. In the interchangeable lens apparatus 10, the control unit 113 receives the command from the camera body 20 by the first communication method through the first communication unit 114. Then, the control unit 113 transmits the correction control information related to the interchangeable lens apparatus 10 to the camera body 20 by the first communication method through the first communication unit 114.

In step S206, the control unit 205 in the camera body 20 transmits the identification information acquired in step S203 to the adapter 30 by the second communication method through the second communication unit 209, and then the processing proceeds to step S207. The adapter 30 stores the identification information received by the second communication method through the second communication unit 308 in the adapter 30.

In step S207, the control unit 205 in the camera body 20 transmits a command (information) for requesting the control information corresponding to the identification information to the adapter 30 by the second communication method through the second communication unit 209, and then the processing proceeds to step S208. The control information can include characteristic information about combined optical characteristics of the interchangeable lens apparatus 10 and the adapter 30 (intermediate accessory apparatus). The characteristic information is associated with state information indicating the state of the interchangeable lens apparatus 10 to be controlled by the camera body 20 (image capturing apparatus) in communication by the first communication method between the interchangeable lens apparatus 10 and the camera body 20 (image capturing apparatus).

Upon receiving the command, the control unit 309 in the adapter 30 determines whether the control information corresponding to the identification information received in step S206 is present (whether the control information is stored in the storage unit 310). If the control information is present, the control unit 309 transmits the control information to the camera body 20 by the second communication method through the second communication unit 308. Otherwise (the control information is not stored in the storage unit 310), the control unit 309 transmits information indicating that the control information is absent (instruction information indicating that the adapter 30 (intermediate accessory apparatus) will not transmit the control information) to the camera body 20 by the second communication method through the second communication unit 308. In step S208, the control unit 205 in the camera body 20 determines whether the control information is acquired. If the control information is acquired (YES in step S208), the processing proceeds to step S209. Otherwise (the instruction information is received) (NO in step S208), the processing proceeds to step S212.

In step S209, the control unit 205 in the camera body 20 transmits a command (information) for requesting state information indicating the state of the interchangeable lens apparatus 10 to the interchangeable lens apparatus 10 by the first communication method through the first communication unit 208. In the interchangeable lens apparatus 10, upon receiving the command, the control unit 113 transmits the state information corresponding to the command to the camera body 20 by the first communication method through the first communication unit 114.

In step S210, control information to be used is determined based on the acquired control information group and state information. This determination can be made based on, for example, an operation on the operation member 207, or a command about an autofocus (AF) function, an autoexposure (AE) function, or other functions (a change instruction in the camera body 20 (image capturing apparatus) about the state of the interchangeable lens apparatus 10). These pieces of information and the determination method will be described below.

In step S211, the control unit 205 in the camera body 20 transmits command information to the interchangeable lens apparatus 10 based on the control information to be used, executing control processing. The control unit 205 executes control processing on the interchangeable lens apparatus 10 (transmits the control information to be used to the interchangeable lens apparatus 10) through the first communication method through the first communication unit 208 based on the control information to be used (image capturing control information). The control processing can be performed by the focus control unit 108, the zoom control unit 109, the iris control unit 110, and the IS control unit 111. Further, the control unit 205 executes the correction of an image signal that will be or has been obtained by image capturing using the image sensor 204, as described above, based on the control information to be used (correction control information). The processing steps S209 to S211 can be repeatedly executed.

In step S212, the control unit 205 in the camera body 20 transmits a command (information) for requesting characteristic information about optical characteristics of the adapter optical member 307 in the adapter 30 to the adapter 30 by the second communication method through the second communication unit 209. The optical characteristics (characteristic information) of the adapter optical member 307 in the adapter 30 can be changed. The characteristic information will be described below. Upon receiving the command through the second communication method through the second communication unit 308, the control unit 309 in the adapter 30 transmits the characteristic information to the camera body 20 by the second communication method through the second communication unit 308.

In step S213, the control unit 205 in the camera body 20 executes processing similar to step S209, and then the processing proceeds to step S214.

In step S214, control information to be used is determined based on the acquired characteristic information and state information. This determination can be made based on, for example, an operation on the operation member 207, or a command about the AF function, the AE function, or other functions. These pieces of information and the determination method will be described below.

In step S215, processing similar to step S211 is executed. The processing steps S213 to S215 can be repeatedly executed.

The above described control processing procedure enables the camera body 20 to perform image capturing using the interchangeable lens apparatus 10 and the adapter 30 and perform correction of the image signal appropriately. This eliminates the need for a specific element in the image capturing system to combine control information unique to the interchangeable lens apparatus 10 with control information unique to the adapter 30 (intermediate accessory apparatus), with no specific element using resources (hardware, software, and time) in the combining processing. For example, image capturing conditions related to the image capturing control information determined as described above are used as the image capturing conditions displayed on the image display unit 206. Further, image capturing conditions related to the image capturing control information determined as described above are used as the image capturing conditions set by an operation on the operation member 207. As a focus position to be corrected (adjusted) by the AF function, a focus position related to the correction control information determined as described above is used. As correction conditions for correcting a magnification chromatic aberration, a decrease in marginal illumination, or a distortion in the image signal acquired by the camera body 20, correction conditions related to the correction control information determined as described above are used.

In some embodiments, the state information about the interchangeable lens apparatus 10 from the interchangeable lens apparatus 10 is not always acquired. After information about the initial state of the interchangeable lens apparatus 10 is acquired, the state information is obtained (calculated) based on the initial state and the history of control processing (drive command) executed by the camera body 20 on the interchangeable lens apparatus 10. For example, after the control unit 205 in the camera body 20 controls the driving of the iris unit 106 in the interchangeable lens apparatus 10 to the initial state, state information about the iris unit 106 is obtained based on a drive command for the iris control unit 110.

Next, a control information group corresponding to (identification information about) each interchangeable lens apparatus will be described. FIG. 3 is a table illustrating details of each control information group according to the first embodiment. The control information is stored in the storage unit 310. In the present embodiment, a case will be described where the interchangeable lens 10 comes in three types of interchangeable lens apparatuses A to C. The control information includes interchangeable lens apparatus identification information (simply referred to as identification information), image capturing control information, and correction control information. Examples of the identification information can include the number or code assigned to each type of the interchangeable lens apparatuses to uniquely identify the type of each interchangeable lens apparatus, and a sequence of numbers or codes. The image capturing control information includes control information for identifying the object distance, focus sensitivity, focal length, and F-number corresponding to each interchangeable lens apparatus. The correction control information includes control information for correction (reduction) for out-of-focus and/or for correction (image processing) for a magnification chromatic aberration, a decrease in marginal illumination, and/or a distortion in image information acquired in the camera body 20. The control information (image capturing control information and correction control information) is related to combinations of the interchangeable lens apparatus 10 (identification information A to C) and the adapter 30.

Upon receiving a command for requesting control information from the camera body 20, the control unit 309 in the adapter 30 identifies the control information corresponding to the identification information received from the camera body 20, and transmits the control information to the camera body 20. For example, if the identification information indicates A, the image capturing control information and correction control information corresponding to the identification information A are transmitted to the camera body 20. The image capturing control information corresponding to the identification information A includes object distance FA, focus sensitivity SA, focal length ZA, and F-number IA. The correction control information corresponding to the identification information A includes out-of-focus PCA, magnification chromatic aberration ACA, decrease in marginal illumination SCA, and distortion DCA.

The image capturing control information is not limited to the object distance, focus sensitivity, focal length, and F-number, but may include other information related to the optical members in the interchangeable lens apparatus 10 and the adapter 30, the other information of which affects the image capturing conditions. Examples of the image capturing control information can include a T-number, the amount of defocus, the amount of vignetting at each image height, an exit pupil position, and an entrance pupil position. The image capturing control information can also include information indicating the relationship between the amount of movement of the IS lens unit 107 and the amount of movement of an image.

Next, a method will be described of determining control information to be used in the camera body 20 based on the control information group and state information. FIG. 4 is a table illustrating a data structure of each control information group according to the first embodiment. In the data structure of control information illustrated in FIG. 4, a focus position indicating a position of the focus lens unit 104, a zoom position indicating a position of the zoom lens unit 105, and an iris position indicating a state (e.g., an aperture) of the iris unit 106 are set as indices. The data structure is a table structure for identifying control information based on the indices. The focus position includes L positions F1 to FL. The zoom position includes M positions Z1 to ZM. The iris position includes N positions I1 to IN.

The control unit 205 in the camera body 20 determines values of object distance F, focus sensitivity S, focal length Z, and F-number I based on the combination of a focus position, a zoom position, and an iris position. For example, when the focus position, the zoom position, and the iris position indicate F1, Z1, and I1, respectively, object distance F111, focus sensitivity S111, focal length Z111, and F-number T111 are determined as the image capturing control information. A single piece of image capturing control information can include a plurality of values. For example, object distance F000 can include a closest-distance-side object distance and an infinite-distance-side object distance.

The control unit 205 in the camera body 20 determines values of out-of-focus PC, magnification chromatic aberration AC, decrease in marginal illumination SC, and distortion DC based on the combination of a focus position, a zoom position, and an iris position. For example, when the focus position, the zoom position, and the iris position indicate F1, Z1, and I1, respectively, out-of-focus PC111, magnification chromatic aberration AC111, decrease in marginal illumination SC111, and distortion DC111 are determined as the correction control information. These pieces of correction control information can include 0-order or n-order coefficients in an n-order polynomial for an image height. In the manner as described above, the control unit 205 in the camera body 20 can determine control information to be used by the camera body 20 based on the control information group and state information.

In the present embodiment, the method has been described of determining control information using a focus position, a zoom position, and an iris position as indices. In one or more embodiments, other information indicating a state of the interchangeable lens apparatus 10 is used as an index for the control information group. For example, Examples of indices can include information about a position of the IS lens unit 107. In other embodiments, the information indicating a state of the interchangeable lens apparatus 10 as an index is omitted. For example, nothing but an iris position is used as an index. In a table structure, the number of indices varies with each item of control information. For example, the number of indices for the focus position for determining the object distance can be L, and the number of indices for the focus position for determining the focus sensitivity can be M. Further, an arithmetic expression for uniquely calculating control information based on state information can be used in place of a table structure using the state information as indices.

Next, the structure of the control information group corresponding to the state information that varies depending on the model of the interchangeable lens apparatus 10 will be described. The state information about the interchangeable lens apparatus 10 that can be acquired by the camera body 20 from the interchangeable lens apparatus 10 varies depending on the model. This means that the index of the control information group has a configuration to allow a determination of control information regardless of the state information acquirable from the interchangeable lens apparatus 10. FIGS. 5A to 5C are tables each illustrating a conversion table between state information and an index according to the first embodiment. FIGS. 5A to 5C each illustrate the structure of the conversion table (correspondence table; correspondence relationship) for correlating values F1 to FN of the focus position set as an index illustrated in FIG. 4 with pieces of state information about the interchangeable lens apparatus 10. FIGS. 5A, 5B, and 5C illustrate the structures of conversion tables for the interchangeable lens apparatuses A, B, and C, respectively.

The interchangeable lens apparatus A supports a command for acquiring information about a normalized position of the focus lens unit 104. The structure of the conversion table illustrated in FIG. 5A is a structure for converting (correlating) the normalized position of the focus lens unit 104 into the corresponding focus position. The interchangeable lens apparatus B supports a command for acquiring information about the object distance. The structure of the conversion table illustrated in FIG. 5B is a structure for converting the object distance into the corresponding focus position. The interchangeable lens apparatus C supports a command for acquiring information about the object distance and information about the focus sensitivity. The interchangeable lens apparatus C has a low resolution for information about the object distance. In response to that, the structure of the conversion table illustrated in FIG. 5C is a structure for converting (correlating) the combination of an object distance and a focus sensitivity into a focus position with a higher resolution. For example, a single piece of information of an object distance of 0.5 m is not enough to determine which of F0 and F1 is set as the focus position. However, which of F0 and F1 is set as the focus position can be determined based on the combination of the object distance and the focus sensitivity. In the present embodiment, the information on the conversion table as described above is included in the control information group and is transmitted from the adapter 30 to the camera body 20. This configuration allows the control unit 205 in the camera body 20 to obtain information about the index based on the control information group and state information, even with no information about the index in the existing interchangeable lens apparatus 10.

Next, a method will be described in detail in which the control unit 205 in the camera body 20 determines control information based on characteristic information and state information. Examples of the characteristic information include information about a magnification of a focal length conversion optical system (focal length conversion lens unit) serving as the adapter optical member 307 in the adapter 30. A focal length (image capturing control information) in the camera body 20 (image capturing apparatus) is obtained by multiplying the magnification by the focal length as the state information acquired from the interchangeable lens apparatus 10. The characteristic information include information about the number of steps for change in the F-number of the ND filter unit serving as the adapter optical member 307 in the adapter 30. The F-number is changed by the number of steps for the change with respect to the F-number used as the state information acquired by the interchangeable lens apparatus 10, giving the F-number (image capturing control information) in the camera body 20 (image capturing apparatus). This configuration allows the image capturing control information in the camera body 20 (image capturing apparatus) to be obtained based on the state information acquired from the interchangeable lens apparatus 10 and the characteristic information acquired from the adapter 30.

Next, a method will be described of determining correction control information in the camera body 20 (image capturing apparatus) based on characteristic information, state information, correction control information about the interchangeable lens apparatus 10, and correction control information about the adapter 30. The correction control information illustrated in FIG. 3 is related to the combination of a type of the interchangeable lens apparatus 10 and the adapter 30. On the other hand, the correction control information stored in the storage unit 310 can be related to nothing but the adapter 30. This means that the correction control information in the camera body 20 (image capturing apparatus) may be determined based on the correction control information and correction control information that is related to the interchangeable lens apparatus 10 alone and that is acquired from the interchangeable lens apparatus 10. This method will now be described.

Let PL denote the amount of out-of-focus related to the interchangeable lens apparatus 10 alone, PA denote the amount of out-of-focus related to the adapter 30 alone PA, X denote the focal length conversion magnification of the adapter optical member 307 in the adapter 30, and P denote the amount of out-of-focus in the camera body 20, the amount of out-of-focus P is expressed by the following expression (1).

$$P=(PL+PA) \times X \tag{1}$$

The amount of out-of-focus PL is included in the correction control information related to the interchangeable lens apparatus 10 alone, which is acquired in step S205. The structure (configuration) of the correction control information about the interchangeable lens apparatus 10 can be similar to the structure (configuration) of the correction control information in the above-described control information group. It is also assumed that the amount of out-of-focus PA is acquired in step S207. The focal length conversion magnification X can be acquired as characteristic information in step S212. This configuration allows the amount of out-of-focus in the camera body 20 (image capturing apparatus) to be determined based on the amount of out-of-focus PL, the amount of out-of-focus PA, and the focal length conversion magnification X. This enables the control unit 205 in the camera body 20 to send a drive command for the focus lens unit 104 to the interchangeable lens apparatus to reduce the amount of out-of-focus determined. In the present embodiment, the focal length conversion magnification X is obtained as the characteristic information, but instead the focal length conversion magnification X may be obtained as a part of the control information group.

As described above, storing the correction control information related to the adapter 30 alone in the storage unit 310 reduces the amount of information to be stored in the storage unit 310. Furthermore, the processing in step S207 reduces the amount of information in the control information group to be transmitted, which leads to a reduction in time for communications related to the starting of the camera body 20 (image capturing apparatus) between the camera body 20 and the adapter 30.

Next, a method will be described of setting image capturing conditions for the interchangeable lens apparatus 10. The settings are made based on optical characteristics of the adapter 30. The control unit 205 in the camera body 20 determines the image capturing conditions (image capturing control information) by the processing in step S213 and S214 based on the characteristic information acquired by the processing in step S212. The control unit 205 performs control processing in step S215 on the interchangeable lens apparatus 10 based on the determined image capturing conditions. For example, when F-numbers are set as image capturing conditions, let F denote the F-number of the image capturing system, FL denote the F-number to be set to the interchangeable lens apparatus 10, and ΔFA denote the rate of change of the F-number in the adapter 30, the F-number FL to be set to the interchangeable lens apparatus 10 is expressed by the following expression (2).

$$F=FL \times \Delta FA \tag{2}$$

For example, when the magnification X (focal length conversion magnification) of the adapter optical member 307 as the focal length conversion optical system is 1.4, ΔFA=1.4. When the F-number is F2.8, the F-number to be set to the interchangeable lens apparatus 10 is F2.

Let V denote the focus movement speed of the image capturing system, VL denote the focus movement speed to be set to the interchangeable lens apparatus 10, and X denote the focal length conversion magnification of the adapter optical member 307, the focus movement speed VL to be set to the interchangeable lens apparatus 10 is expressed by the following expression (3).

$$VL=V \times (1/X^2) \tag{3}$$

As described above, even with the adapter 30 set between the camera body 20 and the interchangeable lens apparatus 10, the camera body 20 can set appropriate image capturing conditions to the interchangeable lens apparatus 10.

Figure 6:
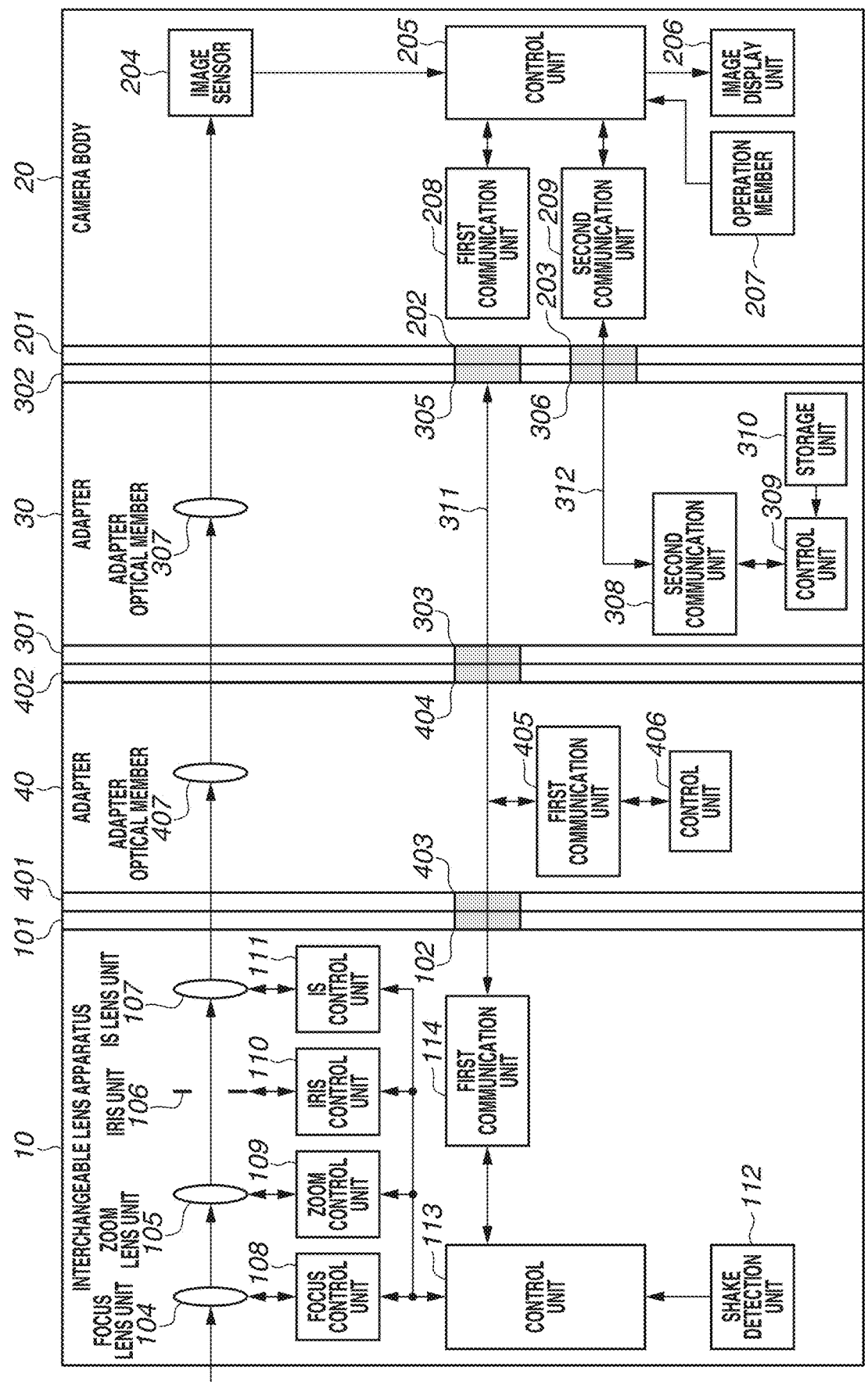
FIG. 6 is a block diagram illustrating a configuration example of an image capturing system according to a second embodiment.

A second embodiment will be described with reference to FIG. 6. The second embodiment differs from the first embodiment in that an adapter 40 (another intermediate accessory apparatus different from the adapter 30) is detachably mounted between the interchangeable lens apparatus 10 and the camera body 20 (adapter 30 in this case). The second embodiment differs from the first embodiment also in that the contact 103 and the second communication unit 115 both for carrying out communications by the second communication method are not included in the interchangeable lens apparatus 10. The second embodiment differs from the first embodiment also in that the contact 304 for carrying out communications by the second communication method is not included in the adapter 30. FIG. 6 is a block diagram illustrating a configuration example of an image capturing system according to the second embodiment. As illustrated in FIG. 6, the adapter 40 includes a mount 401 and is detachably mounted on the interchangeable lens apparatus 10 by the mount 401. The adapter 40 also includes a mount 402 and is detachably mounted on the adapter 30 by the mount 402 and the mount 301. An adapter optical member 407 is, for example, a focal length conversion optical system or an ND filter. A first communication unit 405 is used to carry out a first communication in the adapter 40. A control unit 406 can be a part of a CPU (processing unit) included in the adapter 40.

Figure 7:
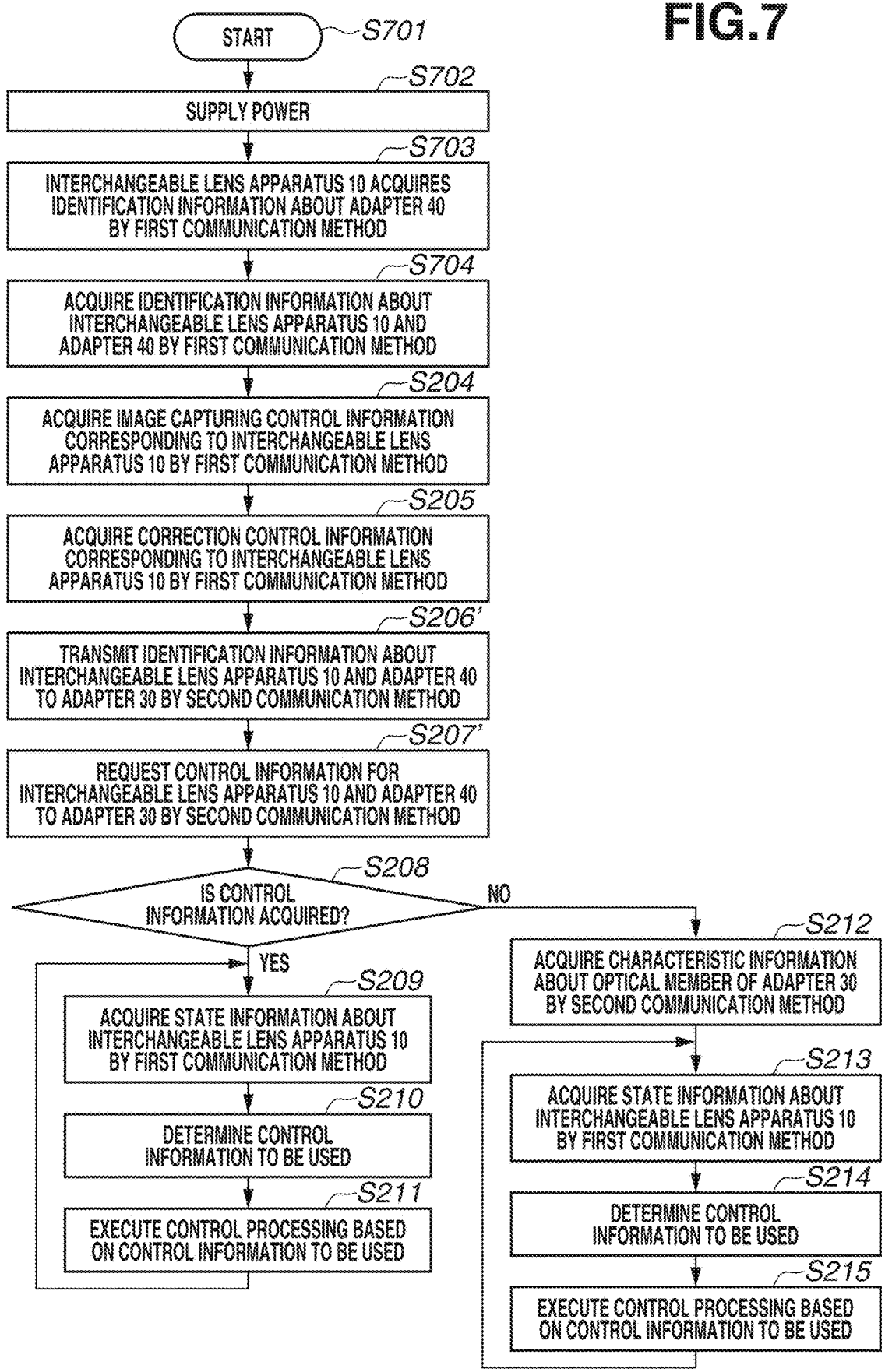
FIG. 7 is a flowchart illustrating a processing procedure according to the second embodiment.

Next, a processing procedure will be described in which the camera body 20 controls the interchangeable lens apparatus 10, the adapter 30, and the adapter 40. FIG. 7 is a flowchart illustrating a processing procedure according to the second embodiment. Like step numbers refer to like processes in the first embodiment illustrated in FIG. 2, and the descriptions thereof will be omitted. First, in step S701, the camera body 20 is started. In step S702, the control unit 205 in the camera body 20 supplies power to the interchangeable lens apparatus 10, the adapter 30, and the adapter 40 through the power supply contacts. In step S703, the interchangeable lens apparatus 10 acquires from the adapter 40 identification information about the adapter 40 through the first communication unit 114 in the interchangeable lens apparatus 10 and through the first communication unit 405 in the adapter 40. The adapter 40 does not carry out the first communication after the identification information is transmitted to the interchangeable lens apparatus 10.

In step S704, the control unit 205 in the camera body 20 transmits a command for requesting the identification information about the interchangeable lens apparatus 10 to the interchangeable lens apparatus 10 through the first communication unit 208 in the camera body 20. Upon receiving the command through the first communication unit 114 in the interchangeable lens apparatus 10, the control unit 113 in the interchangeable lens apparatus 10 transmits the identification information about the interchangeable lens apparatus 10 and the identification information about the adapter 40 to the camera body 20. The control unit 205 in the camera body 20 receives the identification information about the interchangeable lens apparatus 10 and the identification information about the adapter 40 through the first communication unit 208 in the camera body 20. The processing in step S204 and subsequent steps is similar to that illustrated in FIG. 2. The communication method of obtaining the identification information about the adapter 40 is not limited to the first communication method. Any communication method can be used as long as the identification information about the adapter 40 can be acquired through the contacts on the mount 101 and the mount 401, respectively. In step S206', the control unit 205 in the camera body 20 transmits the two pieces of identification information acquired in step S704 to the adapter 30 method through the second communication unit 209 by the second communication, and then the processing proceeds to step S207'. The adapter 30 stores the two pieces of identification information received through the second communication unit 308 in the adapter 30 by the second communication method. In step S207', the control unit 205 in the camera body 20 transmits a command (information) for requesting the control information corresponding to the two pieces of identification information to the adapter 30 by the second communication method through the second communication unit 209, and then the processing proceeds to step S208. The control information include characteristic information about combined optical characteristics of two intermediate accessory apparatuses (adapters 30 and 40) and the interchangeable lens apparatus 10. The characteristic information is associated with state information indicating the state of the interchangeable lens apparatus 10 to be controlled by the camera body 20 (image capturing apparatus) via communication by the first communication method between the interchangeable lens apparatus 10 and the camera body 20 (image capturing apparatus).

The control information corresponding to the identification information about the interchangeable lens apparatus 10 and the identification information about the adapter 40 will now be described. FIG. 8 is a table illustrating details of each control information group according to the second embodiment. The control information group is stored in the storage unit 310. The control information group according to the present embodiment includes the pieces of control information corresponding to the interchangeable lens apparatuses A to C each serving as the interchangeable lens apparatus 10, and control information corresponding to a combination of information "A" indicating the interchangeable lens apparatus 10 and information "D" indicating the adapter 40.

The control information group according to the present embodiment includes the identification information about the type of the interchangeable lens apparatus 10 and also the identification information about the adapter 40. Depending on the configuration of the control information group, the control unit 309 in the adapter 30 determines the control information corresponding to the combination of the type of the interchangeable lens apparatus 10 and the adapter 40.

The above-described configuration of the image capturing system even with the adapter 40 included therein allows the control unit 205 in the camera body 20 to determine control information to be used based on the control information group and state information. Further, the control unit 205 sets appropriate image capturing conditions to the interchangeable lens apparatus 10.

In the present embodiment, one adapter 40 is mounted, but instead a plurality of adapters 40 may be mounted. If a plurality of adapters 40 is mounted, the control unit 205 in the camera body 20 may acquire control information about each adapter 40. This allows the control unit 205 to obtain a variation or a rate of change in image capturing conditions in all the adapters 40, determining image capturing conditions to be set to the interchangeable lens apparatus 10 based on the variation or the rate of change.

Other Embodiments

One or more functions according to the above-described embodiments can be implemented by a program for implementing the one or more functions. The program can be supplied to an apparatus, a system, or the like via a network, a storage medium, or the like, and the program can be read out by one or more processors in a computer of the apparatus, the system, or the like and can be executed. The one or more functions can also be implemented by a circuit (e.g., an application specific integrated circuit (ASIC)) for implementing the one or more functions.

While the embodiments of the present invention have been described above, the present invention is not limited to the embodiments. The present invention can be modified or changed in various ways within the scope of the invention.

According to the embodiments of the present invention, an intermediate accessory apparatus beneficial for an image capturing apparatus to control an interchangeable lens apparatus can be provided.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is determined by the scope of the following claims.

This application claims the benefit of Japanese Patent Application No. 2020-155593, filed Sep. 16, 2020, which is hereby incorporated by reference herein in its entirety.

What is claimed is:

1. An intermediate accessory apparatus configured to be detachably mounted between an interchangeable lens apparatus and an image pickup apparatus, the intermediate accessory apparatus comprising:
   a storage configured to store characteristic information about a combined optical characteristic of the interchangeable lens apparatus and the intermediate accessory apparatus, the characteristic information being associated with state information indicating a state of the interchangeable lens apparatus, the state information being communicated via a first communication between the interchangeable lens apparatus and the image pickup apparatus; and a processor configured to receive identification information about the interchangeable lens apparatus from the image pickup apparatus, and transmit the characteristic information corresponding to the identification information to the image pickup apparatus, via a second communication between the intermediate accessory apparatus and the image pickup apparatus.

2. The intermediate accessory apparatus according to claim 1, wherein the processor is configured to receive identification information about another intermediate accessory apparatus via the second communication from the image pickup apparatus, the other intermediate accessory apparatus being detachably mounted between the interchangeable lens apparatus and the image pickup apparatus.

3. The intermediate accessory apparatus according to claim 2, wherein the processor is configured to transmit the characteristic information corresponding to the identification information about the interchangeable lens apparatus and the identification information about the other intermediate accessory apparatus to the image pickup apparatus via the second communication.

4. The intermediate accessory apparatus according to claim 1, wherein the processor is configured, in a case where the corresponding characteristic information is not stored in the storage, to transmit information indicating the case to the image pickup apparatus via the second communication.

5. The intermediate accessory apparatus according to claim 4, wherein an optical characteristic of the intermediate accessory apparatus is configured to be variable, wherein the processor is configured to transmit the characteristic information about the optical characteristic to the image pickup apparatus via the second communication, and wherein in the case where the corresponding characteristic information is not stored in the storage, command information based on the state information, a change instruction in the image pickup apparatus about the state, and the characteristic information about the intermediate accessory apparatus is transmitted from the image pickup apparatus to the interchangeable lens apparatus via the first communication.

6. The intermediate accessory apparatus according to claim 1, wherein the storage is configured to store information about a correspondence relationship between the state and the state information.

7. The intermediate accessory apparatus according to claim 1, wherein an optical characteristic of the intermediate accessory apparatus is configured to be variable, and the processor is configured to transmit characteristic information about the optical characteristic to the image pickup apparatus via the second communication.

8. The intermediate accessory apparatus according to claim 7, wherein command information based on the characteristic information about the combined optical characteristic, the state information, a change instruction in the image pickup apparatus about the state, and the characteristic information about the intermediate accessory apparatus is transmitted from the image pickup apparatus to the interchangeable lens apparatus via the first communication.

9. The intermediate accessory apparatus according to claim 1, wherein characteristic information about an optical characteristic of the interchangeable lens apparatus is transmitted from the interchangeable lens apparatus to the image pickup apparatus via the first communication, wherein characteristic information about an optical characteristic of the intermediate accessory apparatus is transmitted from the intermediate accessory apparatus to the image pickup apparatus via the second communication, and wherein command information based on the characteristic information about the interchangeable lens apparatus, the state information, and a change instruction in the image pickup apparatus about the state, and the characteristic information about the intermediate accessory apparatus is transmitted from the image pickup apparatus to the interchangeable lens apparatus via the first communication.

10. An image pickup system comprising:

the intermediate accessory apparatus according to claim 1; and an image pickup apparatus on which the intermediate accessory apparatus is detachably mounted.

11. An image pickup apparatus on which an intermediate accessory apparatus configured to be detachably mounted between an interchangeable lens apparatus and the image pickup apparatus is detachably mounted, the image pickup apparatus comprising:

a processor configured to receive identification information about the interchangeable lens apparatus from the interchangeable lens apparatus via a first communication with the interchangeable lens apparatus through the intermediate accessory apparatus, transmit the identification information to the intermediate accessory apparatus via a second communication with the intermediate accessory apparatus, and receive characteristic information about a combined optical characteristic of the interchangeable lens apparatus and the intermediate accessory apparatus from the intermediate accessory apparatus via the second communication, the characteristic information being corresponding to the identification information and associated with state information indicating a state of the interchangeable lens apparatus, the state information being communicated via the first communication.

12. The image pickup apparatus according to claim 11, wherein the state information is transmitted from the interchangeable lens apparatus to the image pickup apparatus via the first communication.

13. The image pickup apparatus according to claim 11, wherein command information based on the characteristic information, the state information, and a change instruction in the image pickup apparatus about the state is transmitted from the image pickup apparatus to the interchangeable lens apparatus via the first communication.

14. The image pickup apparatus according to claim 11, wherein the processor is configured to receive indication information indicating that the intermediate accessory apparatus does not transmit the characteristic information from the intermediate accessory apparatus via the second communication.

15. The image pickup apparatus according to claim 14, wherein an optical characteristic of the intermediate accessory apparatus is configured to be variable, wherein the processor is configured to receive characteristic information about the optical characteristic from the intermediate accessory apparatus via the second communication, and wherein in a case where the instruction information is received from the intermediate accessory apparatus, command information based on the state information, a change instruction in the image pickup apparatus about the state, and the characteristic information about the intermediate accessory apparatus is transmitted from the image pickup apparatus to the interchangeable lens apparatus via the first communication.

16. The image pickup apparatus according to claim 11, wherein the characteristic information includes information about a correspondence relationship between the state and the state information.

17. The image pickup apparatus according to claim 11, wherein an optical characteristic of the intermediate accessory apparatus is configured to be variable, and the processor is configured to receive characteristic information about the optical characteristic from the intermediate accessory apparatus via the second communication.

18. The image pickup apparatus according to claim 17, wherein command information based on the characteristic information about the combined optical characteristic, the state information, a change instruction in the image pickup apparatus about the state, and the characteristic information about the intermediate accessory apparatus is transmitted from the image pickup apparatus to the interchangeable lens apparatus via the first communication.

19. The image pickup apparatus according to claim 11,
wherein characteristic information about an optical characteristic of the interchangeable lens apparatus is transmitted from the interchangeable lens apparatus to the image pickup apparatus via the first communication,
wherein characteristic information about an optical characteristic of the intermediate accessory apparatus is transmitted from the intermediate accessory apparatus to the image pickup apparatus via the second communication, and
wherein command information based on the characteristic information about the interchangeable lens apparatus, the state information, a change instruction in the image pickup apparatus about the state, and the characteristic information about the intermediate accessory apparatus is transmitted from the image pickup apparatus to the interchangeable lens apparatus via the first communication.

20. An image pickup system comprising:
the image pickup apparatus according to claim 11; and
an intermediate accessory apparatus configured to be detachably mounted between an interchangeable lens apparatus and the image pickup apparatus, the intermediate accessory apparatus being detachably mounted on the image pickup apparatus.

21. A non-transitory computer-readable storage medium storing a program for causing a computer to execute processing in an intermediate accessory apparatus configured to be detachably mounted between an interchangeable lens apparatus and an image pickup apparatus, the intermediate accessory apparatus including a storage configured to store characteristic information about a combined optical characteristic of the interchangeable lens apparatus and the intermediate accessory apparatus, the characteristic information being associated with state information indicating a state of the interchangeable lens apparatus, the state information being communicated via a first communication between the interchangeable lens apparatus and the image pickup apparatus, the processing comprising:
receiving identification information about the interchangeable lens apparatus from the image pickup apparatus via a second communication between the intermediate accessory apparatus and the image pickup apparatus; and
transmitting the characteristic information corresponding to the identification information to the image pickup apparatus via the second communication, the characteristic information being stored in the storage.

22. A non-transitory computer-readable storage medium storing a program for causing a computer to execute processing in an image pickup apparatus on which an intermediate accessory apparatus configured to be detachably mounted between an interchangeable lens apparatus and the image pickup apparatus is detachably mounted, the processing comprising:
receiving identification information about the interchangeable lens apparatus from the interchangeable lens apparatus via a first communication with the interchangeable lens apparatus through the intermediate accessory apparatus;
transmitting the identification information to the intermediate accessory apparatus via a second communication with the intermediate accessory apparatus; and
receiving characteristic information about a combined optical characteristic of the interchangeable lens apparatus and the intermediate accessory apparatus from the intermediate accessory apparatus via the second communication, the characteristic information being corresponding to the identification information and associated with state information indicating a state of the interchangeable lens apparatus, the state information being communicated via the first communication.

23. An intermediate accessory apparatus configured to be detachably mounted between an interchangeable lens apparatus and an image pickup apparatus, the intermediate accessory apparatus comprising:
a storage configured to store characteristic information about a combined optical characteristic of the interchangeable lens apparatus and the intermediate accessory apparatus, being associated with identification information of the interchangeable lens apparatus and state information of the interchangeable lens apparatus;
a processor configured to transmit characteristic information about the combined optical characteristic of the interchangeable lens apparatus and the intermediate accessory apparatus to the image pickup apparatus;
a first communication terminal that constitutes a first communication channel used for communication between the image pickup apparatus and the interchangeable lens apparatus; and
a second communication terminal that constitutes a second communication channel which is different from the first communication channel, used for communication between the image pickup apparatus and the intermediate accessory apparatus,
wherein identification information of the interchangeable lens apparatus and state information of the interchangeable lens apparatus are transmitted from the interchangeable lens apparatus to the image pickup apparatus via the first communication channel,
wherein identification information of the interchangeable lens apparatus is transmitted from the image pickup apparatus to the intermediate accessory apparatus via the second communication channel, and wherein the processor transmits characteristic information about the combined optical characteristic of the interchangeable lens apparatus and the intermediate accessory apparatus, corresponding to identification information of the interchangeable lens apparatus and being associated with state information of the interchangeable lens apparatus, to the image pickup apparatus via the second communication channel.

24. The intermediate accessory apparatus according to claim 23, wherein a communication method of the communication using the first communication channel is different from a communication method of the communication using the second communication channel.

25. The intermediate accessory apparatus according to claim 23, wherein the communication using the first communication channel is performed independently from the communication using the second communication channel.

26. An image pickup apparatus on which an intermediate accessory apparatus configured to be detachably mounted between an interchangeable lens apparatus and the image pickup apparatus is detachably mounted,
wherein the intermediate accessory apparatus stores characteristic information about a combined optical characteristic of the interchangeable lens apparatus and the intermediate accessory apparatus, being associated with identification information of the interchangeable lens apparatus and state information of the interchangeable lens apparatus,
the image pickup apparatus comprising:
a processor configured to receive identification information of the interchangeable lens apparatus and state information of the interchangeable lens apparatus from the interchangeable lens apparatus, and receive characteristic information about the combined optical characteristic of the interchangeable lens apparatus and the intermediate accessory apparatus from the intermediate accessory apparatus;
a first communication terminal that constitutes a first communication channel used for communication between the image pickup apparatus and the interchangeable lens apparatus; and
a second communication terminal that constitutes a second communication channel which is different from the first communication channel, used for communication between the image pickup apparatus and the intermediate accessory apparatus,
wherein the processor:
receives identification information of the interchangeable lens apparatus and state information of the interchangeable lens apparatus from the interchangeable lens apparatus via the first communication channel,
transmits identification information of the interchangeable lens apparatus to the intermediate accessory apparatus via the second communication channel, and
receives characteristic information about the combined optical characteristic of the interchangeable lens apparatus and the intermediate accessory apparatus, corresponding to identification information of the interchangeable lens apparatus and being associated with state information of the interchangeable lens apparatus, from the intermediate accessory apparatus via the second communication channel.

27. The image pickup apparatus according to claim 26, wherein a communication method of the communication using the first communication channel is different from a communication method of the communication using the second communication channel.

28. The image pickup apparatus according to claim 26, wherein the communication using the first communication channel is performed independently from the communication using the second communication channel.

* * * * *